(12) United States Patent
Barzelay et al.

(10) Patent No.: US 10,688,629 B2
(45) Date of Patent: Jun. 23, 2020

(54) TORQUE WRENCH HAVING SELF-ADJUSTING ADAPTER

(71) Applicant: TYM LABS L.L.C., Saddle Brooke, NJ (US)

(72) Inventors: Abraham Barzelay, Paramus, NJ (US); Jagdish Dhanjibhai Makwana, Jersey City, NJ (US)

(73) Assignee: TYM LABS, L.L.C., Saddle Brook, NJ (US)

( * ) Notice: Subject to any disclaimer, the term of this patent is extended or adjusted under 35 U.S.C. 154(b) by 157 days.

(21) Appl. No.: 15/488,124

(22) Filed: Apr. 14, 2017

(65) Prior Publication Data
US 2018/0297182 A1    Oct. 18, 2018

(51) Int. Cl.
| B25B 17/00 | (2006.01) |
| B25B 13/18 | (2006.01) |
| B23P 19/06 | (2006.01) |

(52) U.S. Cl.
CPC .............. *B25B 13/18* (2013.01); *B23P 19/06* (2013.01)

(58) Field of Classification Search
USPC ...... 81/57.29, 57.26, 57.22, 90.1, 90.2, 90.3
See application file for complete search history.

(56) References Cited

U.S. PATENT DOCUMENTS

| 1,970,721 | A |   | 8/1934  | Walton |
| 2,477,528 | A |   | 7/1949  | Schrader |
| 2,756,792 | A |   | 7/1956  | Hirschman |
| 2,764,050 | A |   | 9/1956  | Leibowitz |
| 2,884,826 | A | * | 5/1959  | Bruhu ..................... B25B 13/44 81/128 |
| 3,373,639 | A |   | 3/1968  | Dalen |
| 3,724,299 | A | * | 4/1973  | Nelson .................... B25B 13/44 81/128 |
| 3,979,965 | A |   | 9/1976  | Vuceta |
| 4,043,228 | A |   | 8/1977  | Venezio |
| 4,911,040 | A |   | 3/1990  | Kim |
| 5,123,310 | A |   | 6/1992  | McManus |
| 5,213,015 | A |   | 5/1993  | Disston |
| 5,305,670 | A | * | 4/1994  | Fossella ................. B25B 13/44 81/128 |
| 5,375,489 | A |   | 12/1994 | McClure |

(Continued)

OTHER PUBLICATIONS

New Application to Abraham Barzelay entitled "Torque Wrench Having Self-Adjusting Adapter" filed on Apr. 14, 2017.
(Continued)

*Primary Examiner* — Joseph J Hail
*Assistant Examiner* — Shantese L McDonald

(57) ABSTRACT

A torque wrench is disclosed for use in rotating a range of different sized fasteners. The torque wrench may include an input end configured to receive a torsional input, and a gear train operatively driven to rotate by the torsional input. The torque wrench may further include a driver connected to the gear train at an output end and having an axial end surface with a plurality of arcuate slots formed in the axial end surface, and a plurality of clamps each pinned to a corresponding one of the plurality of arcuate slots and moveable by rotation of the driver to radially engage a range of different sized fasteners. The torque wrench may additionally include a housing configured to enclose the gear train, the driver, and the plurality of clamps.

20 Claims, 5 Drawing Sheets

(56) References Cited

U.S. PATENT DOCUMENTS

| | | | |
|---|---|---|---|
| 5,501,107 A | 3/1996 | Snyder | |
| 5,918,511 A * | 7/1999 | Sabbaghian | B25B 13/44 81/128 |
| 6,073,522 A * | 6/2000 | Carnesi | B25B 13/44 279/114 |
| 6,202,516 B1 | 3/2001 | Kim | |
| 6,715,380 B2 * | 4/2004 | Listl | B25B 21/00 81/57.13 |
| 7,062,996 B2 * | 6/2006 | Johnson | B25B 13/44 81/128 |
| 7,530,253 B2 | 5/2009 | Spenser | |
| 8,695,462 B1 | 4/2014 | Jorgensen | |
| 8,893,592 B2 | 11/2014 | Womack | |
| 9,583,904 B2 | 2/2017 | Battenfeld | |
| 9,757,232 B2 | 9/2017 | Peterson | |
| 2002/0096020 A1 | 7/2002 | Hart | |
| 2005/0183548 A1 | 8/2005 | Horobec | |
| 2006/0107798 A1 | 5/2006 | Falzone | |
| 2006/0283265 A1 | 12/2006 | Izumisawa | |
| 2007/0251359 A1 | 11/2007 | Junkers et al. | |
| 2008/0282846 A1 | 11/2008 | Sharif-Mehr | |
| 2009/0309282 A1 | 12/2009 | Wang | |
| 2011/0056337 A1 | 3/2011 | Buchanan | |
| 2012/0103142 A1 | 5/2012 | Sroka | |
| 2014/0053693 A1 * | 2/2014 | Womack | B25B 13/12 81/128 |
| 2018/0015593 A1 | 1/2018 | Wang | |
| 2018/0043515 A1 | 2/2018 | Zelniker | |

OTHER PUBLICATIONS

Search Report and Written Opinion dated Jul. 19, 2018, in PCT Application No. PCT/US2018/027244 (7 pages).

\* cited by examiner

TORQUE WRENCH HAVING SELF-ADJUSTING ADAPTER

TECHNICAL FIELD

The present disclosure is directed to a torque wrench and, more particularly, to a torque wrench having a self-adjusting adapter.

BACKGROUND

A torque wrench is a tool designed to exert torque on a fastener (e.g., on a bolt head or nut having specially designed inner and/or outer surfaces) to loosen or tighten the fastener. In some embodiments, the torque wrench is powered. For example, the torque wrench can be hydraulically, pneumatically, or electrically powered. In other examples, the torque wrench is manually manipulated.

Conventional torque wrenches connect to the fastener via an adapter. For example, a hexagonal socket having an internal diameter corresponding to an external diameter of the fastener is temporarily connected to the torque wrench and then placed over the fastener. The hexagonal socket is configured to internally receive the head of the fastener and inhibit relative movement of the fastener during the application of torque by the wrench. Sockets are available in many different sizes to accommodate different sizes of fasteners.

Although conventional torque wrenches and socket-type adapters may be acceptable for some applications, they can also be problematic. For example, in order to be capable of accomplishing any task presented in the field, a technician may be required to carry around a large assortment of sockets of different sizes. This can be burdensome for the technician and expensive to stock and maintain. In addition, it can be difficult to immediately match the correct socket to a given fastener, leading to a delay in removing or installing the fastener. And each time a new fastener is encountered, a new socket may be required to address the new fastener.

The torque wrench and adapter of the present disclosure solves one or more of the problems set forth above and/or other problems of the prior art.

SUMMARY

One aspect of the present disclosure is directed to a torque wrench. The torque wrench may include an input end configured to receive a torsional input, and a gear train operatively driven to rotate by the torsional input. The torque wrench may further include a driver connected to the gear train at an output end and having an axial end surface with a plurality of arcuate slots formed in the axial end surface, and a plurality of clamps each pinned to a corresponding one of the plurality of arcuate slots and moveable by rotation of the driver to radially engage a range of different sized fasteners. The torque wrench may additionally include a housing configured to enclose the gear train, the driver, and the plurality of clamps.

Another aspect of the present disclosure is directed to an adjustable adapter module for use with a torque wrench. The adjustable adapter module may include a driver configured to receive a rotational input from the torque wrench and having an axial end surface with a plurality of arcuate slots formed in the axial end surface. The adjustable adapter module may also include a plurality of clamps each pinned to a corresponding one of the plurality of arcuate slots and moveable by rotation of the driver to radially engage and lock onto a range of different sized fasteners.

Another aspect of the present disclosure is directed to a torque assembly. The torque assembly may include a wrench, an adjustable adapter module, and a retention assembly configured to retain the adjustable adapter module connected to the wrench. The adjustable adapter module may include a driver configured to receive a rotational input from the torque wrench and having an axial end surface with a plurality of arcuate slots formed in the axial end surface. Each of the plurality of arcuate slots may have a leading end located radially further from an axis of rotation than a trailing end. The adjustable adapter module may also include a plurality of clamps each pinned to a corresponding one of the plurality of arcuate slots and moveable by rotation of the driver to radially engage and lock onto a range of different sized fasteners. The adjustable adapter module may further include a plurality of pins, each connected to an outer end of a corresponding one of the plurality of clamps opposite a fastener engagement surface and configured to slide within a corresponding one of the plurality of arcuate slots. The adjustable adapter module may additionally include a guide having a plurality of radially oriented channels. Each of the plurality of radially oriented channels may be configured to guide a corresponding one of the plurality of clamps into engagement with the different sized fasteners. The guide may be pinned to the driver.

DETAILED DESCRIPTION

Figure 1:
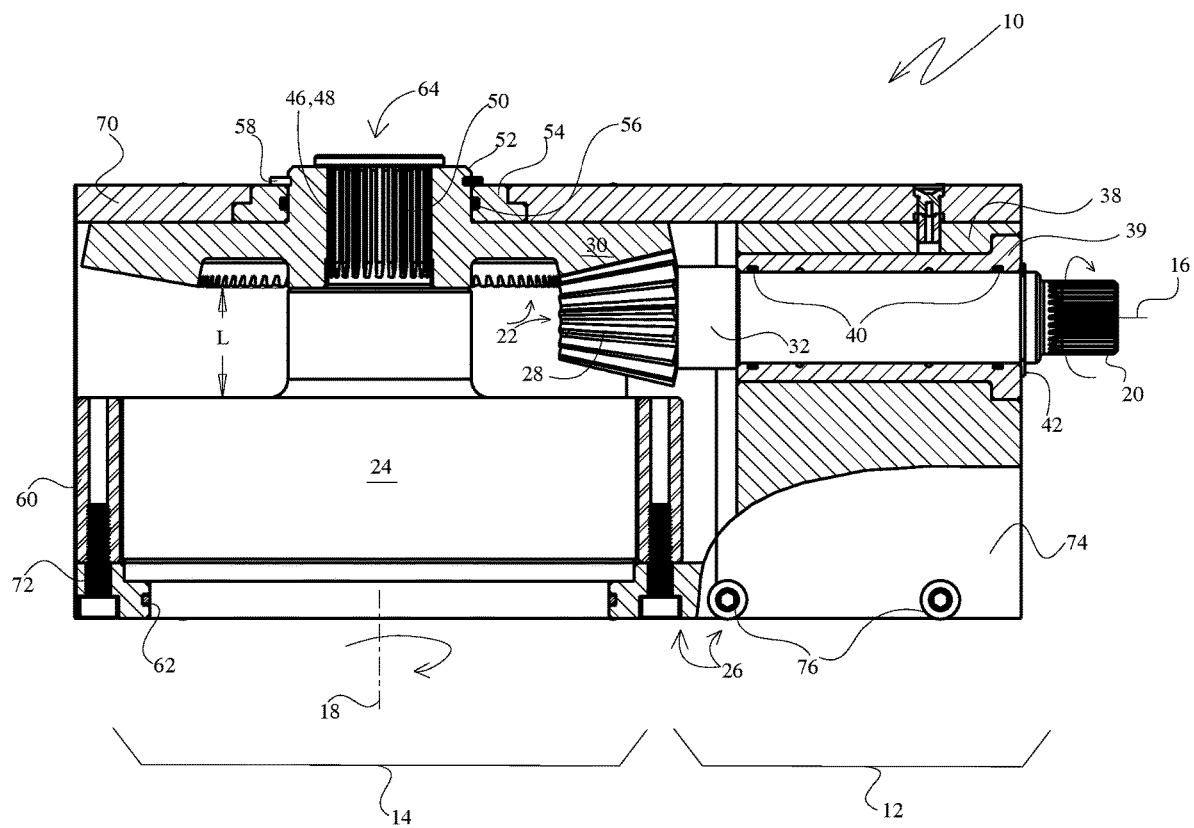
FIG. 1 is an cross-sectional illustration of an exemplary disclosed torque wrench.
Figure 4:
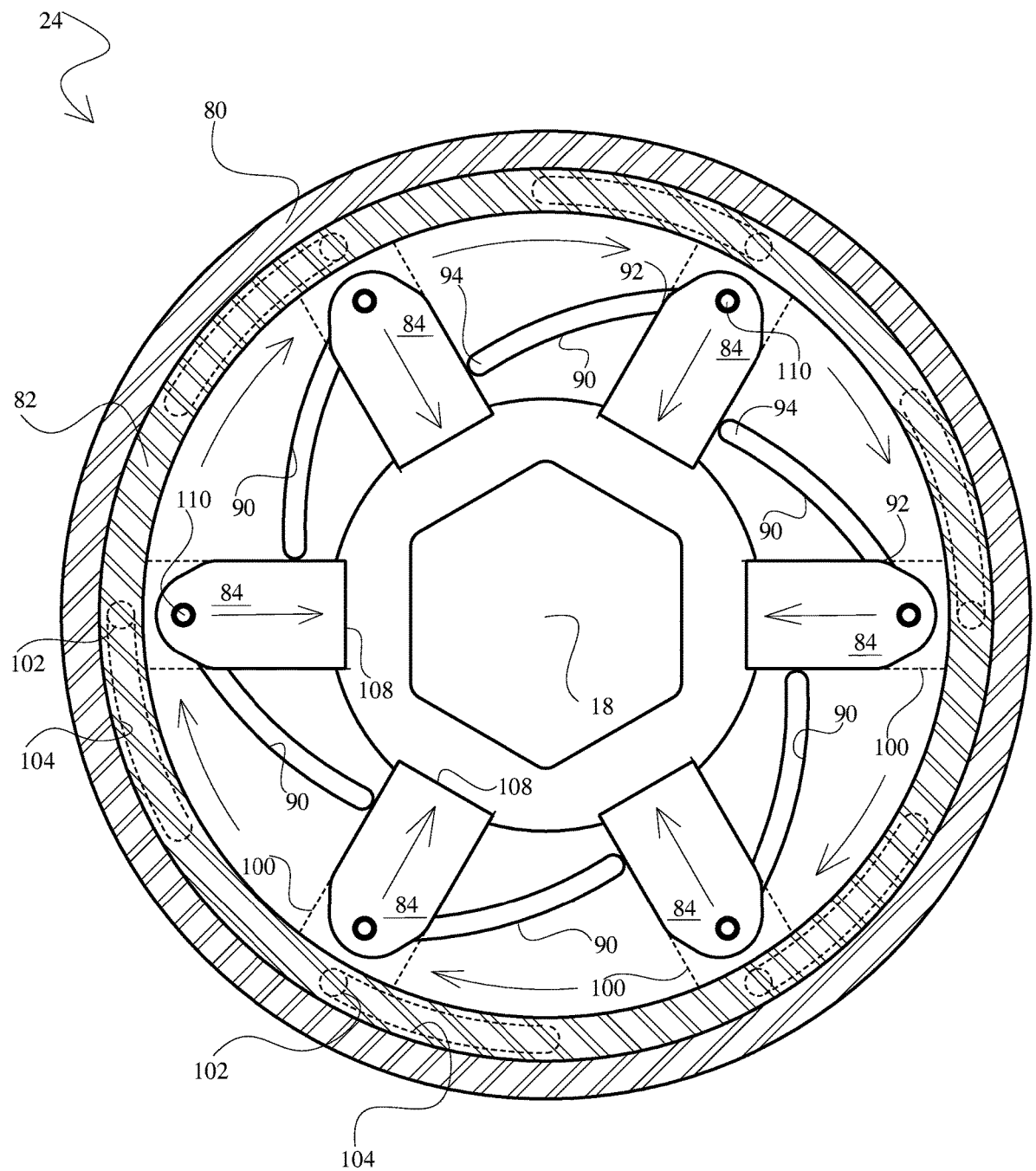
FIG. 4 is a cross-sectional illustration of the adjustable adapter of FIG. 3.

FIG. 1 illustrates an exemplary torque wrench ("wrench") 10 that can be used to loosen or tighten a fastener (e.g., a bolt having a head with internal and/or external engagement features—shown only in FIG. 4). Wrench 10 may generally be divided into an input end 12 and an output end 14. Input end 12 may be configured to receive a torsional input (e.g., from a manually operated lever or from an electric, hydraulic, or pneumatic motor), which is then transformed into a torsional output at output end 14. The torsional input may be generally aligned with a first axis 16 of wrench 10, while the torsional output may be generally aligned with a second axis 18 that is substantially (e.g., within 0-10°) orthogonal to first axis 18. Input end 12 may include an engagement interface (e.g., a socket; a splined, torx, or square stub shaft; etc.) 20 configured to mate with a corresponding engagement interface of the lever or motor and receive the torsional input.

In one embodiment, input end 12 of wrench 10 may not mate directly with the lever or motor described above. Instead, an optional engagement unit (not shown) may be disposed between wrench 10 and the lever or motor. The engagement unit may be configured to selectively create a mechanical coupling between input end 12 and the lever or motor, for example based on a speed, pressure, flow rate, power, and/or other parameter associated with wrench 10 and/or the lever or motor. In one embodiment, the mechanical coupling of the engagement unit could be selectively interrupted, such that a hammering effect is created within wrench 10 that helps to loosen and/or tighten a corresponding fastener.

Figure 2:
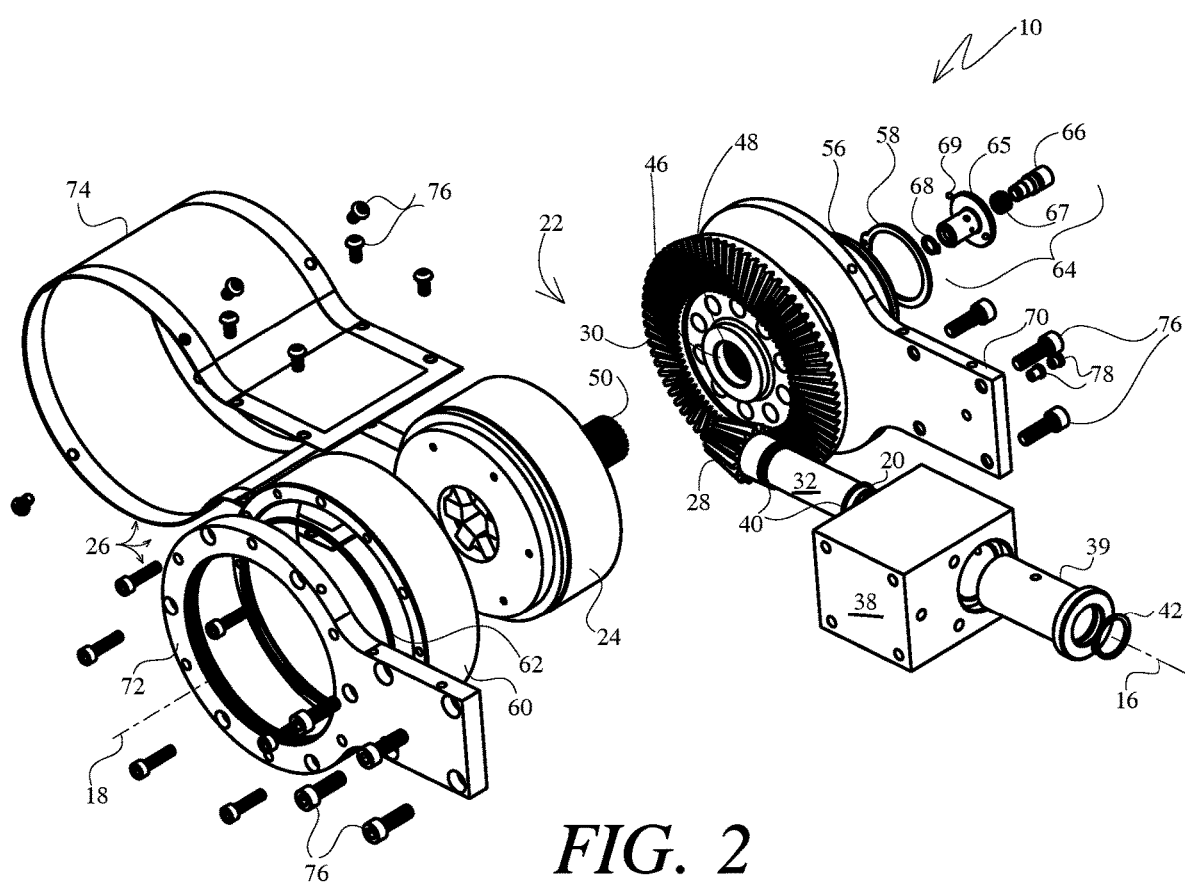
FIG. 2 is an exploded view illustration of the torque wrench of FIG. 1.

As shown in FIGS. 1 and 2, wrench 10 may be assembly of multiple different components that cooperate to transfer torque received at input end 12 to output end 14. These components may include, among other things, a gear train 22, an adjustable adapter 24, a housing 26 configured to support and enclose gear train 22 and adjustable adapter 24, and a variety of hardware that retains and seals gear train 22 and adjustable adapter 24 within housing 26.

Gear train 22 may include a pinion gear 28 and a crown gear 30. Pinion gear 28 may be formed at an end of a shaft 32 that extends to engagement interface 20, and may include a plurality of teeth that engage and drive corresponding teeth of crown gear 30. In the disclosed embodiment, the teeth of pinion gear 28 and crown gear 30 are beveled, such that pinion gear 28 may rotate about axis 16 while crown gear 30 rotates about axis 18. It is contemplated that the teeth of these gears could be straight and have a conical pitch (e.g., pinion gear 28 could be a straight bevel gear), curved and have a conical pitch (e.g., pinion gear 28 could be a spiral bevel gear), or curved and have a hypoid pitch (e.g., pinion gear 28 could be a hypoid bevel gear), as desired.

Pinion gear 28 may be supported within housing 26 by way of a bearing block 38. For example, a bearing (e.g., bushing, needle bearing, roller bearing, etc.) 39 may be disposed within bearing block 38 and configured to slidingly receive shaft 32 in an axial direction and to support rotation of shaft 32. One or more seals (e.g., o-rings or gaskets) 40 and/or retainers (e.g., circlips, snaprings, etc.) 42 may be used to seal and/or retain bearing 39 and/or shaft 32 in place within housing 26.

Crown gear 30 may have teeth extending toward an outer annular periphery, and include a central opening 46 with engagement features (e.g., internal splines, cogs, gear teeth, etc.) 48 formed therein. Features 48 may be configured to engage corresponding features 50 of adjustable adapter 24. A shoulder 52 may surround opening 46 at a back (i.e., non-toothed) side of crown gear 30 and function to position and support rotation of crown gear 30 within housing 26. A bushing 54 may be placed against the back side of crown gear 30 and around shoulder 52, and include a step that passes through a corresponding opening within housing 26. A seal (e.g., o-rings or gaskets) 56 may be annularly sandwiched between bushing 54 and shoulder 52, and a retainer (e.g., a circlip, snapring, etc.) 58 may engage a corresponding groove in shoulder 52 to retain crown gear 30 in place.

A bushing 60 may be placed around adjustable adapter 24 at an opposite side of wrench 10, and a seal (e.g., o-rings or gaskets) 62 may be annularly sandwiched between housing 26 and adjustable adapter 24. In the example of FIG. 1, adjustable adapter 24 may have an axial length L sufficient to provide internal clearance for bushing 60 around pinion gear 28 inside of housing 26. In particular, in this example, adjustable adapter 24 may function at least partially as a spacer that maintains a desired distance between bushing 60 and pinion gear 28.

A retaining sub-assembly ("sub-assembly") 64 may be used, in some embodiments, at the closed or non-accessible side of wrench 10 to retain connection between adjustable adapter 24 and crown gear 30. As shown in FIG. 2, sub-assembly 64 may include, among other things, a locking housing ("housing") 65, a pin 66, a spring 67, a clip 68, and one or more balls 69. Housing 65 may be generally cylindrical and hollow, having a shaft that is received within adjustable adapter 24, and an annular flange located at an exposed end that rests against shoulder 52 of crown gear 30. Pin 66 may pass a distance through the shaft of housing 65, and clip 68 may engage the protruding end to inhibit separation of pin 66 from housing 65. Spring 67 may be trapped inside of the shaft of housing 65, between an internal lip of the shaft of housing 65 and an external shoulder of pin 66. In this configuration, pin 66 may be pushed downward against a bias of spring 67, and the bias may urge pin 66 out of housing 65. However, pin 66 may not leave housing 65 due to the connection with clip 68. Balls 69 may rest in pockets co-formed by external recesses of pin 66 and internal recesses of housing 65. When sub-assembly 64 is placed into an exposed end of adjustable adapter 24, balls 69 may be pushed outward and into engagement with corresponding recesses inside adjustable adapter 24, such that a mechanical interference is created between balls 69, internal walls of adjustable adapter 24, and walls of housing 65.

Housing 26 of wrench 10 may also be an assembly of multiple components. The components of housing 26 may include among other things, first and second plates 70, 72 oriented in opposition to each other, and a shroud 74 that wraps around edges of plates 70, 72 to surround and enclose adjustable adapter 24 and gear train 22. Each of plates 70, 72 may be generally rectangular at input end 12 to match a size and shape of bearing block 38, and generally rounded and concentric with crown gear 30 at output end 14. The openings through which bushing 54 and adjustable adapter 24 pass may be located at a general center of the rounded portions of plates 70, 72. Any number of fasteners 76 may be used to connect shroud 74 to the edges of plates 70, 72 and/or to connect plates 70, 72 to bearing block 38.

In one embodiment, wrench 10 may be sealed from the environment at an elevated or positive pressure. For example, one or more fittings (e.g., one-way valves) 78 may be connected to housing 26 (e.g., to one or more both of plates 70, 72) and configured to admit a lubricant (e.g., grease) into housing 26 without allowing escape of the lubricant. The lubricant may be pressurized, such that external contaminates (e.g., water, air, debris, etc.) do not enter housing 26. This may allow wrench 10 to be operated in harsh conditions (e.g., under water or in contaminated environments) without undue effects. The sealed nature of wrench 10, combined with an inherent low rotational speed and temperature, may also reduce maintenance requirements. In particular, the grease may be retained inside wrench 10 for a life of wrench 10 without significant degradation (e.g., because of the clean and cool environment inside of sealed housing 26).

Figure 3:
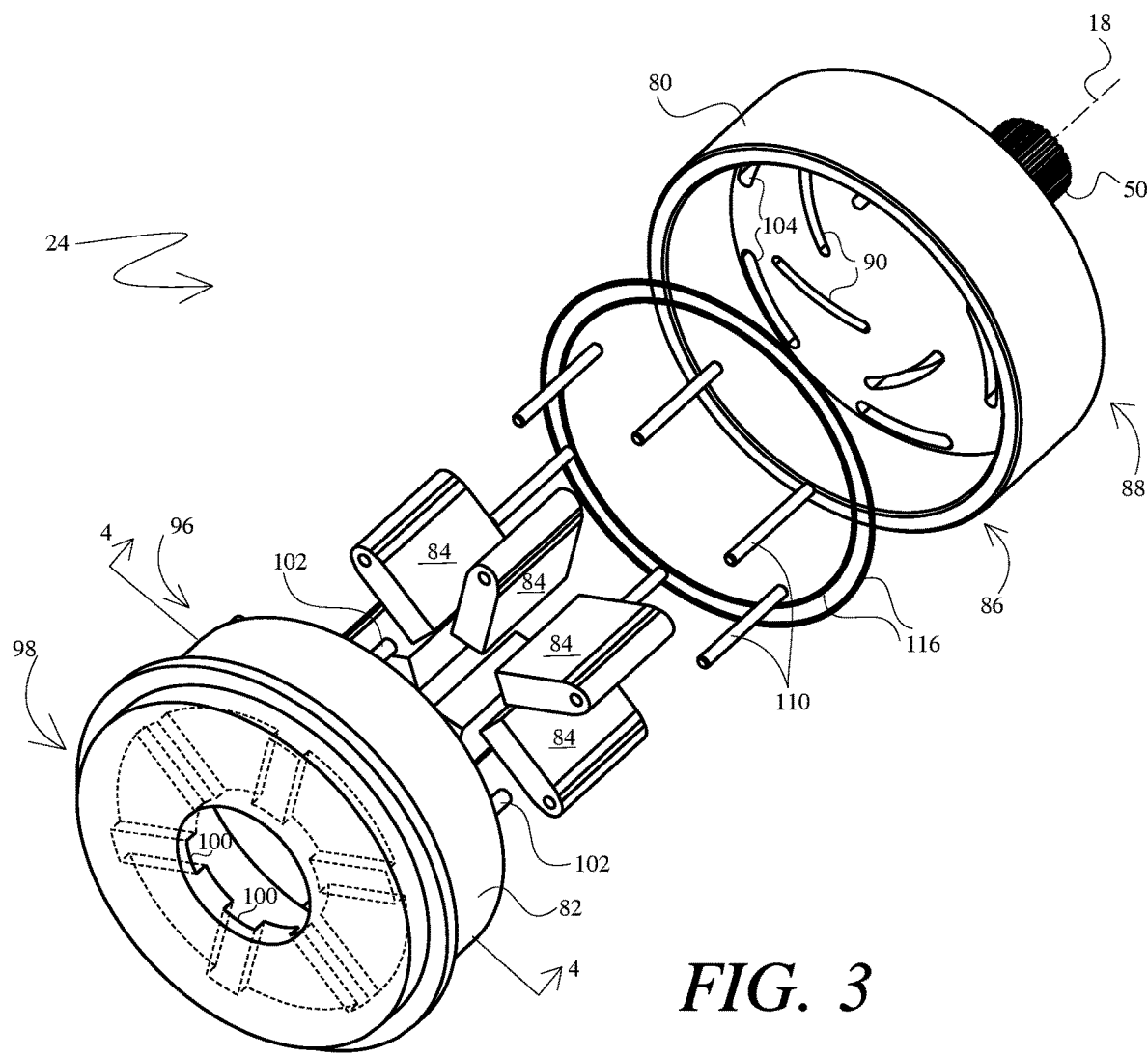
FIG. 3 is an exploded view illustration of an exemplary adjustable adapter that may form a portion of the torque wrench of FIGS. 1 and 2.

FIGS. 3 and 4 illustrate an exemplary embodiment of adjustable adapter 24. As shown in these figures, adjustable adapter 24 may be an assembly of components that function to engage and rotate an associated fastener, as crown gear 30 (referring to FIGS. 1 and 2) is rotated inside of wrench 10. These components may include, among other things, a driver 80, a guide 82, and a plurality of clamps 84 that are moved by driver 80 into guided contact with the head of the fastener.

Driver 80 may be generally cylindrical and hollow, having an open end 86 and an opposing closed end 88. Features 50 of driver 80, which are described above as engaging features 48 of crown gear 30 (referring to FIGS. 1 and 2), may protrude in a normal direction from an outer axial surface at closed end 88. A plurality of (e.g., six) arcuate slots 90 may be formed within an axial end surface of driver 80. As shown in FIG. 4, slots 90 may be equally distributed around the end surface of driver 80, and each may include a leading end 92 located radially further from axis 18 and a trailing end 94 located radially closer to axis 18. With this configuration, a rotation of crown gear 30 (referring to FIGS. 1 and 2) may result in a corresponding rotation of driver 80 and slots 90. It should be noted that a radial offset between leading and trailing ends 92, 94 of slots 90, as well as an arc-length of slots 90, may be adjustable and tailored to accommodate a specific size-range of fasteners accepted by adjustable adapter 24 and/or a speed of fastener engagement that may be needed for specific applications.

Guide 82 may also be generally cylindrical and hollow, having a first open end 96 and an opposing second open end 98. An opening at first end 96 may be larger than an opening at second end 98. First end 96 may be received within driver 80 (e.g., within an annular space located radially outward of slots 90). Second end 98 may be configured to receive the associated fastener that is to be loosened or tightened. A plurality of radially oriented channels 100 may be distributed around an inner axial surface of guide 82 and extend radially from an inner periphery of guide 82 to the opening at second end 98. Each channel 100 may have a width sufficient to slidingly receive a corresponding clamp 84.

A post 102 may be mounted to guide 82 at an outer end of each channel 100 and configured to engage corresponding arcuate slots 104 formed within the axial end surface of driver 80 after assembly. Slots 104, unlike slots 90, may have a centerline that is located a constant distance from axis 18, such that posts 102 rotate through slots 104 during relative rotation between driver 80 and guide 82. As will be described in more detail below, the engagement of posts 102 with ends of slots 104 may result in the transfer of torque between driver 80 and guide 82.

Clamp 84 be a generally elongated cuboid configured to slide with channel 100 of guide 82 when moved by driver 80. Each clamp 84 may include a generally rounded surface 106 at an outer-most end, and a generally flat surface 108 at an inner-most end. A post 110 may pass through clamp 84 adjacent surface 106 and ride within the slot 90 of driver 80, while surface 108 may engage a corresponding flat land of the bolt head. With this configuration, as driver 80 is rotated by crown gear 30 (referring to FIGS. 1 and 2), slot 90 may move from engagement with post 110 at leading end 92 to engagement with post 110 at trailing end 94. This operation, due to the radial offset between leading and trailing ends 92, 94, may force clamp 84 to slide radially inward within channel 100 of guide 82 until surface 108 engages the flat land of the bolt head. Similarly, as driver 80 is rotated in a second direction by crown gear 30 (referring to FIGS. 1 and 2), slot 90 may move from engagement with post 110 at trailing end 94 to engagement with post 110 at leading end 92. This operation, due to the radial offset between leading and trailing ends 92, 94, may force clamp 84 (via post 110) to slide radially outward within channel 100 of guide 82, pulling surface 108 away from the flat land of the bolt head.

In some embodiments, adjustable adapter 24 may itself be sealed from its environment and/or from the rest of wrench 10 in the same manner described above regarding wrench 10. For example, a seal 116 may be disposed between driver 80 and guide 82, and one or more fittings (e.g., one-way valves) 78 may be connected to driver 80 and/or guide 82 and configured to admit a lubricant (e.g., grease) into adjustable adapter 24 without allowing escape of the lubricant. The lubricant may be pressurized, such that external contaminates (e.g., water, air, debris, etc.) do not enter adjustable adapter 24. This may allow adjustable adapter 24 to be removed from wrench 10, reoriented, and/or used with a different wrench 10 without undue effects caused by external contamination.

Figure 5:
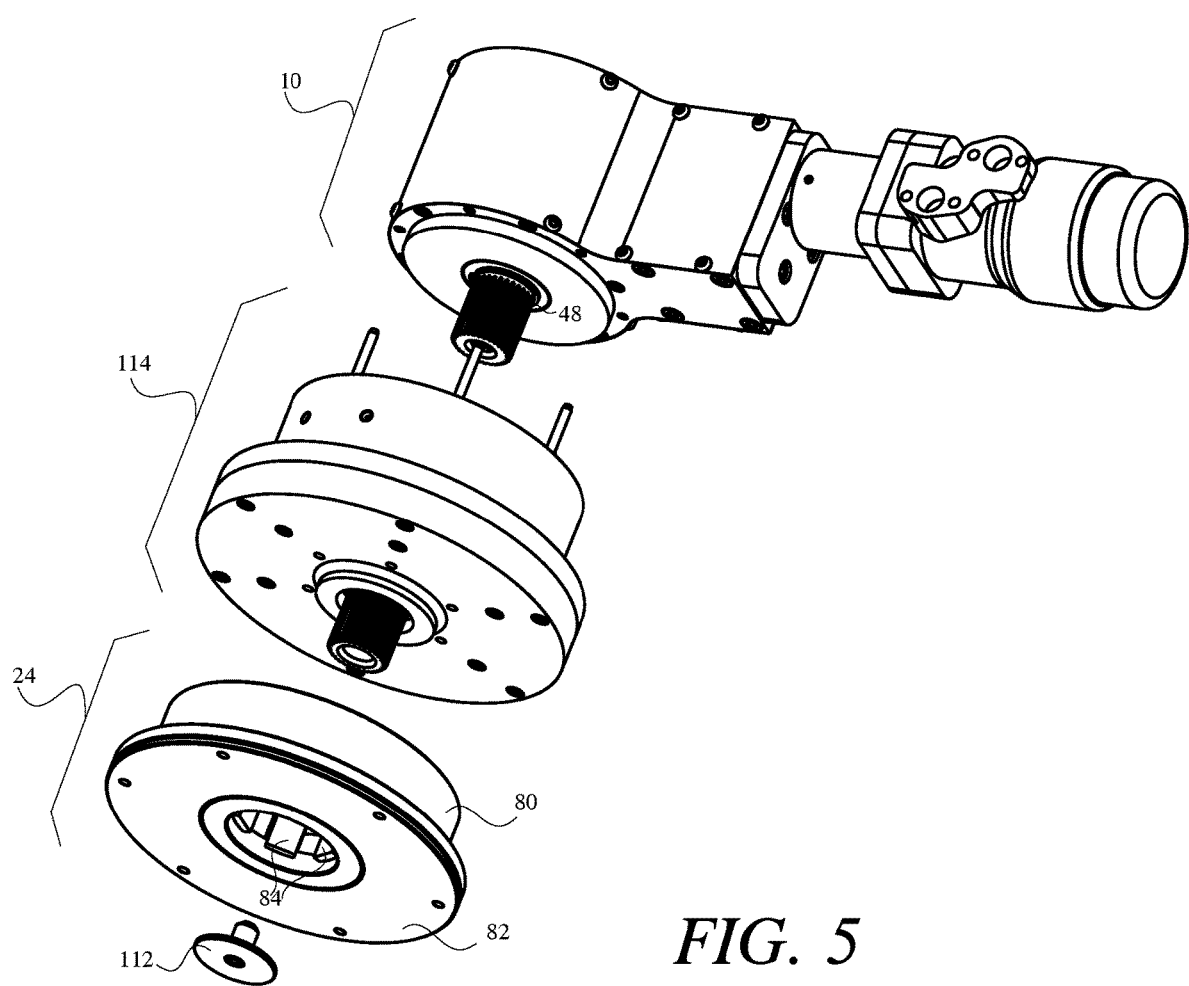
FIG. 5 is an exploded view illustration of an exemplary torque assembly having an adjustable adapter module and a torque wrench.

FIG. 5 illustrates an alternative embodiment of wrench 10 and adjustable adapter 24. In this embodiment, adjustable adapter 24 may be a separate and stand-alone module that can be selectively used with wrench 10 or with another tool (e.g., a manual wrench or lever—not shown). Like the previously described embodiment, adjustable adapter 24 of FIG. 5 may include driver 80, guide 82, clamps 84, slots 90, posts 102, slots 104, and posts 110. However, in the embodiment of FIG. 5, bushing 60 may not be required; guide 82 may not be mounted within plate 70 of wrench housing 26; and features 48 of crown gear 30 may be male and protrude into closed end 88 of driver 80 to engage corresponding female features (not shown). In addition, an optional retention assembly 112 (e.g., an assembly substantially identical to retention sub-assembly 64 described above) may be used to retain connection between wrench 10 and adjustable adapter 24).

In some embodiments, wrench 10 and adjustable adapter 24 may be used with another module, if desired. For example, one or more torque multiplier modules 114 may be disposed between wrench 10 and adjustable adapter 24. Torque multiplier module 114 may be configured to receive a torque input from wrench 10, increase the torque, and provide the increased torque to adjustable adapter 24. In this embodiment, the various modules may be stacked on top of each other, and one or more retention assemblies 112 may be used to hold the stack together.

INDUSTRIAL APPLICABILITY

The torque wrench and adjustable adapter of the present disclosure have wide application in many different industries. The disclosed torque wrench and adjustable adapter may be used anywhere that a range of different-sized fasteners are to be loosened or tightened with high-levels of torque and/or at high speed without having to use multiple different adapters. For example, the disclosed torque wrench and adjustable adapter may be used in the oil and gas industry to join segments of a pipeline together. Operation of wrench 10 and adjustable adapter 24 will now be described with reference to FIGS. 1 and 4.

To loosen and/or tighten a fastener, the opening of guide 82 at end 98 may be placed over the head of the fastener. Driver 80 should already be rotated to its starting position prior to placement over the fastener, such that slots 90 are engaged with posts 110 of clamps 84 at leading end 92 (shown in FIG. 4). This may help ensure that clamps 84 are located within channels 100 at their furthers-apart positions. Adjustable adapter 24 should be capable of receiving a largest fastener within its operational range at this time.

If adjustable adapter 24 is internal to wrench 10, torque may now be applied to input end 12 of wrench 10. If adjustable adapter 24 is a separate and stand-alone module, adjustable adapter 24 may be connected to wrench 10 via retention assembly 112, after which the torque may be applied to input end 12 of wrench 10. It is also contemplated that adjustable adapter 24 may first be connected to wrench 10, and then placed over the fastener head, if desired. The applied torque may cause pinion gear 28 to rotate about axis 16 and generate a corresponding rotation of crown gear 30 about axis 18 (referring to FIG. 1). The rotation of crown gear 30 may be transmitted to driver 80 via features 48 and 50. As driver 80 is rotated, slots 90 may also be caused to rotate such that posts 110 of clamps 84 slide along inside slots 90 toward the trailing end 94. Due to the radial offset between leading end 92 and trailing end 94, clamps 84 may be caused to slide radially inward within channels 100 until end surfaces 108 engage corresponding flat lands of the bolt head. The bolt head may become locked within adjustable adapter 24 at this point in time.

After the bolt head becomes locked within adjustable adapter 24, additional torque applied to wrench 10 may be transmitted through driver 80, slots 90 and 104 to posts 110 and 102, and clamps 84 to the fastener. Depending on the orientation of slots 90 within driver 80 and the direction of the torque, the torque may result in a corresponding loosening or tightening of the fastener. To achieve an opposite effect, an adjustable adapter 24 having an opposite orientation of slots 90 may be required. It is contemplated that adjustable adapters 24 may be dedicated to only loosening or to only tightening. Alternatively, it is contemplated that driver 80 may be reversible, such that slots 90 can be reoriented in a desired manner to achieve desired loosening or tightening.

After the fastener has been loosened or tightened, the torque applied to wrench 10 may be reversed. This reversal may cause pinion gear 28 to rotate about axis 16 in an opposite direction and generate a corresponding opposite rotation of crown gear 30 about axis 18 (referring to FIG. 1). The opposite rotation of crown gear 30 may be transmitted to driver 80 via features 48 and 50. As driver 80 is rotated in the opposite direction, slots 90 may also be caused to rotate in the opposite direction such that posts 110 of clamps 84 slide within slots 90 toward the leading end 94. Due to the radial offset between leading end 92 and trailing end 94, clamps 84 may be caused to slide radially outward within channels 100, allowing surfaces 108 to move away from the corresponding flat lands of the bolt head. The bolt head may become unlocked within adjustable adapter 24 at this point in time, and adjustable adapter 24 and wrench 10 may be removed from the fastener.

The disclosed torque wrench and adjustable adapter may be versatile. Specifically, the disclosed torque wrench, via the adjustable adapter, may be used to loosen and/or tighten any fastener within its given size range. This may allow for a technician to address a greater variety of situations with a reduced amount of equipment. The increased capacity may increase profit and efficiency, while the reduced amount of equipment may reduce owning and operating costs.

The disclosed torque wrench and adjustable adapter may be capable of reliably producing high-levels of torque. In particular, the disclosed gear train inside of the wrench may allow for efficient torque transmission with little or no backlash.

Finally, the disclosed torque wrench and adjustable adapter may be simple and low-cost to maintain. In particular, because the disclosed torque wrench and adjustable adapter may be sealed and pressurized, these tools may not need to be opened, cleaned, and/or lubricated frequently. In addition, the sealed and pressurized nature of the disclosed torque wrench and adjustable adapter may allow for usage in locations and/or conditions (e.g., underwater and/or in contaminated environments) not heretofore possible.

It will be apparent to those skilled in the art that various modifications and variations can be made to the torque wrench and adjustable adapter of the present disclosure without departing from the scope of the disclosure. Other embodiments will be apparent to those skilled in the art from consideration of the specification and practice of the torque wrench and adjustable adapter disclosed herein. It is intended that the specification and examples be considered as exemplary only, with a true scope of the disclosure being indicated by the following claims and their equivalents.

What is claimed is:

1. A torque wrench comprising:
   an input end configured to receive a torsional input;
   an output end configured to deliver a torsional output;
   a driver at the output end and having a with a plurality of arcuate slots formed in the surface;
   a plurality of clamps each including a post that rides within a corresponding one of the plurality of arcuate slots and each being moveable by rotation of the driver to radially engage a fastener to which the torsional output is to be delivered; and
   a guide having a plurality of channels extending in a radial direction, wherein the guide includes a radially central region adapted to receive the fastener so that each of the plurality of channels is aligned with the fastener when the torsional output is being delivered, and wherein each of the plurality of channels is configured to guide a corresponding one of the plurality of clamps into engagement with the fastener,
   whereby the plurality of clamps may radially engage a range of different sized fasteners.

2. The torque wrench of claim 1, further including a gear train connected to the driver and operatively driven to rotate by the torsional input and further including a housing configured to enclose the gear train, the driver, and the plurality of clamps.

3. The torque wrench of claim 2, wherein each of the plurality of arcuate slots has a leading end located radially further from an axis of rotation than a trailing end.

4. The torque wrench of claim 3, wherein:
   the plurality of arcuate slots is a first plurality of arcuate slots; and
   the driver further includes a second plurality of arcuate slots located radially outward of the first plurality of arcuate slots.

5. The torque wrench of claim 4, wherein the guide is pinned to the driver via the second plurality of arcuate slots.

6. The torque wrench of claim 2, wherein the gear train, the driver, and the guide are all sealed inside the housing from a surrounding environment at a positive pressure.

7. The torque wrench of claim 1, wherein the guide comprises an open end and wherein the open end of the guide is received within an annular space of the driver located radially outward from the plurality of arcuate slots.

8. The torque wrench of claim 1, further including a feature extending from the driver in a normal direction at a side opposite the plurality of clamps to engage a gear train.

9. The torque wrench of claim 1, wherein:
   the torsional input is aligned with a first axis of the torque wrench; and
   a torsional output of the plurality of clamps is aligned with a second axis of the torque wrench that is substantially orthogonal to the first axis.

10. The torque wrench of claim 1, wherein each clamp has a width wider than the post and wherein each channel has a width sufficient to slidingly receive the width of the clamp.

11. The torque wrench of claim 1, wherein each clamp comprises a cuboid configuration that slides within the corresponding channel.

12. An adjustable adapter module for use with a torque wrench, the adapter module comprising:

a driver configured to receive a rotational input from the torque wrench and having a surface with a plurality of arcuate slots formed in the surface;

a plurality of clamps each including a post that rides within a corresponding one of a plurality of arcuate slots and each being moveable radially by rotation of the driver; and a guide having a plurality of radially extending channels, each of the plurality of channels being configured to guide a corresponding one of the plurality of clamps into engagement with a fastener, wherein each clamp has a width wider than the post and wherein each channel has a width sufficient to slidingly receive the width of the clamp, whereby the plurality of clamps may radially engage a range of different sized fasteners.

13. The adjustable adapter module of claim 12, wherein each of the plurality of arcuate slots has a leading end located radially further from an axis of rotation than a trailing end.

14. The adjustable adapter module of claim 13, wherein:
the plurality of arcuate slots is a first plurality of arcuate slots; and
the driver further includes a second plurality of arcuate slots located radially outward of the first plurality of arcuate slots.

15. The adjustable adapter module of claim 14, wherein:
the guide is pinned to the driver via the second plurality of arcuate slots; and leading and trailing ends of each of the plurality of arcuate slots are located an equal distance from the axis of rotation.

16. The adjustable adapter module of claim 14, further including:
a plurality of pins, each connected to an open end of the guide and configured to slide within a corresponding one of the second plurality of arcuate slots.

17. The torque wrench of claim 12, wherein each clamp comprises a cuboid configuration that slides within the corresponding channel.

18. A torque assembly, comprising:
a wrench;
an adjustable adapter module, including:
a driver configured to receive a rotational input from the wrench and having a surface with a plurality of arcuate slots formed in the surface, wherein each of the plurality of arcuate slots has a leading end located radially further from an axis of rotation than a trailing end;

a plurality of clamps each pinned to a corresponding one of the plurality of arcuate slots and moveable by rotation of the driver to radially engage and lock onto a fastener;

a plurality of pins, each connected to an outer end of a corresponding one of the plurality of clamps opposite a fastener engagement surface and configured to slide within a corresponding one of the plurality of arcuate slots; and a guide having a plurality of channels, each of the plurality of channels being configured to guide a corresponding one of the plurality of clamps into engagement with the different sized fasteners, wherein the guide is pinned to the driver; and a retention assembly configured to retain the adjustable adapter module connected to the wrench, whereby the plurality of clamps may radially engage a range of different sized fasteners.

19. The torque assembly of claim 18 further comprising a torque multiplier module.

20. The torque assembly of claim 19, wherein the torque multiplier module is disposed between the wrench and the adjustable adapter module.

* * * * *